United States Patent [19]

Shimonou et al.

[11] 4,216,415
[45] Aug. 5, 1980

[54] POSITION CONTROL SYSTEM COMPRISING A DIGITAL ALGEBRAIC ADDER CIRCUIT

[75] Inventors: Shigeru Shimonou; Hiroshi Inada, both of Tokyo, Japan

[73] Assignee: Nippon Electric Co., Ltd., Tokyo, Japan

[21] Appl. No.: 911,263

[22] Filed: May 31, 1978

[30] Foreign Application Priority Data

May 31, 1977 [JP] Japan .................................. 52-64310
Jun. 1, 1977 [JP] Japan .................................. 52-65079
Jun. 1, 1977 [JP] Japan .................................. 52-65083
Jun. 3, 1977 [JP] Japan .................................. 52-65947
Feb. 17, 1978 [JP] Japan .................................. 53-17810

[51] Int. Cl.² .......................................... G05B 19/26
[52] U.S. Cl. ................................. 318/600; 318/601
[58] Field of Search .............. 318/571, 600, 594, 601, 318/602

[56] References Cited

U.S. PATENT DOCUMENTS

| 4,085,890 | 4/1978 | Kimura et al. ................... 318/571 X |
| 4,101,006 | 7/1978 | Jensen et al. .................... 318/600 X |
| 4,146,922 | 3/1979 | Brown et al. ........................ 318/601 |

*Primary Examiner*—B. Dobeck
*Attorney, Agent, or Firm*—Sughrue, Rothwell, Mion, Zinn and Macpeak

[57] ABSTRACT

A system for controllably driving a motor to place a movable element at a position indicated by a command signal from an external source produces, in response to a phase staggered incremental position signal pair, one and the other of two position pulse sequences at a time depending on an instantaneous angular velocity of the motor. Responsive to the command signal and the position pulses, a mode signal is produced to indicate a position control mode while a position error is within a predetermined range and otherwise a velocity control mode. Likewise, a signal is produced that represents at least one reference angular velocity and the position error during the respective modes. Responsive to the position pulses alone, gate pulses are produced either with two different pulse widths depending on the modes or with a single pulse width. During presence of each gate pulse and dependent on the sense of the instantaneous angular velocity indicated by the position pulses, a digital algebraic adder circuit calculates an algebraic sum of the reference angular velocity or the position error and a reference feedback value, which may either be memorized in the system or supplied from the source and may take two digital values depending on the modes. A digital signal representative of the sums and either the reference angular velocity or the position error during presence and absence, respectively, of the gate pulses is converted to an analog signal, which is smoothed and amplified to provide a motor drive signal.

12 Claims, 14 Drawing Figures

POSITION CONTROL SYSTEM COMPRISING A DIGITAL ALGEBRAIC ADDER CIRCUIT

BACKGROUND OF THE INVENTION

This invention relates to a position control or positioning control system responsive in general to a sequence of position commands supplied from an external source for intermittently controllably positioning a movable element at successively commanded positions. More specifically, this invention ralates to a position control system for either a carriage or a type or print wheel, drum, or cylinder of a serial printer of the type known as an impact type in the art.

An impact type serial printer for use in combination with an electronic digital computer comprises a carriage, a carriage motor for reciprocating the carriage along a predetermined path, and a position control system for controllably driving the motor so as to successively intermittently place the carriage at desired linear positions commanded by the computer. A rotary type wheel carrying a plurality of type elements is mounted on the the carriage together with a type wheel motor for rotating the type wheel. A similar position control system contrallably drives the type wheel motor to intermittently place the type wheel at desired rotational positions commanded also by the computer. Successively selected type elements are thereby placed at a printing position determined relative to the carriage. A position control system for controllably positioning a movable machine element, such as the carriage or the type wheel, to a commanded position comprises an increment encoder or position transducer mechanically or otherwise coupled to the motor. It is already known to make the encoder produce a pair of phase staggered or displaced incremental position signals, which is in effect representative of an angle of rotation of the motor and a current or instantaneous angular velocity thereof and hence a current position and an instantaneous speed of the movable element. The position signals are subtracted from the command signal so as to provide an error signal representative of a position error between the current and the commanded positions. The motor is controlled to render the position error zero. It is to be noted here that the commanded positions are selected from a plurality of predetermined positions with repetition allowed.

In U.S. Pat. No. 3,954,163 issued to Andrew Gabor on May 4, 1976, a position control system for an impact serial printer is disclosed wherein each of a motor for a carriage and another motor for a rotary print wheel is controllably driven by a first motor drive signal at first until the movable element reaches a point spaced a predetermined distance from each commanded position and then by a second motor drive signal until the element eventually rests at the commanded position. By the use of a velocity logic unit depicted in FIG. 7 of Gabor at 67 and in his FIG. 12 in two parts at 157 and 158, an analog velocity signal is produced from the position signal to indicate a current speed of the element, namely, a current angular velocity of the motor. An analog velocity reference signal is produced in response to an external control signal and to the position signal. The first motor drive signal is given by algebraically summing the velocity reference signal and the analog velocity signal. An analog position error signal is produced from an external command signal and the position signal to indicate a position error of the element. The second motor drive signal is given by algebraically summing the position error signal and the analog velocity signal. Use of analog signals, however, makes it difficult to achieve expected results in productivity and maintenance of the position control systems. The above-mentioned velocity logic unit is complicated in structure. Furthermore, it is rendered difficult to provide a compact system. This means that the position control system becomes bulky and accordingly highly expensive.

SUMMARY OF THE INVENTION

It is therefore an object of the present invention to provide a position control system operable on a digital basis.

It is another object of this invention to provide a position control system of the type described, which is simple in structure and is therefore compact and not expensive.

It is still another object of this invention to provide a position control system of the type described, which is capable of optimally controlling a variable angular velocity of a motor for a movable element and consequently positioning the element at each commanded position at high speed and with a high precision.

It is a further object of this invention to provide a position control system of the type described, wherein use is unnecessary of a complicated velocity logic unit for producing an analog signal indicative of an instantaneous angular velocity of the motor in response to incremental position signals.

It is possible to manufacture essential parts of a position control system according to this invention as an integrated circuit.

A position control system to which this invention is applicable is for use in combination with a movable element, a motor rotatable with a variable angular velocity to controllably vary a current position of the element, and a command signal generator for producing a command signal indicative of a commanded position of the element. The angular velocity has either of two senses of rotation at a time. The system comprises an increment encoder to be coupled to the motor to produce a pair of polarity variable incremental position signals and servo control means responsive to the command and the position signals for supplying a motor drive signal to the motor to make the motor move the element eventually to the commanded position. The position signals vary their respective polarities with a phase difference therebetween in response to every predetermined incremental angle of rotation of the motor. Each of the position signals thereby varies its polarity at a rate dependent on a current angular velocity of the motor. The phase difference is representative of the sense of the current angular velocity. In accordance with this invention, the servo control means comprises position pulse producing means responsive to the incremental position signals for producing position pulses representative of an angular position of the motor and the current angular velocity, mode signal producing means responsive to the command signal and the position pulses for producing a mode signal during an interval of time during which the current position is within a predetermined distance from the commanded position, and control signal producing means responsive to the command signal, the position pulses, and the mode signal for producing a control signal representative of a digital control datum. The control datum gives a position error between the current and the commmanded positions during presence of the mode signal and otherwise gives at least one reference angular velocity. The servo control means further comprises gate pulse producing means responsive to the position pulses for producing gate pulses of a predetermined pulse width at a time at a rate dependent on the current angular velocity and digital adder means responsive to a reference signal representative of a digital reference feedback value at a time, the gate pulses, the position pulses, and the control signal for calculating during presence of each of the gate pulses an algebraic sum of the reference feedback value and the control datum to produce a digital signal. The algebraic sum is one of an arithmetic sum and a difference that is determined by that sense of the current angular velocity to which the above-mentioned each gate pulse is related. The digital signal is representative of the algebaric sums and the control data during presence and absunce, respectively, of the gate pulses. The servo control means still further comprises a driving signal producing circuit responsive to the digital signal for producing the motor drive signal.

The reference signal may be produced by memory means comprised by the digital adder means. Alternatively, the reference signal is supplied to the digital adder means from the command signal generator.

BRIEF DESCRIPTION OF THE DRAWING

FIG. 12 (b) schematically illustrates, for a velocity control mode, a few signals that appear in the position control system shown in FIG. 2;

FIG. 13 (b) schematically illustrates, for a position control mode, a few signals that appear in the position control system depicted in FIG. 2.

DESCRIPTION OF THE PREFERRED EMBODIMENTS

Figure 1:
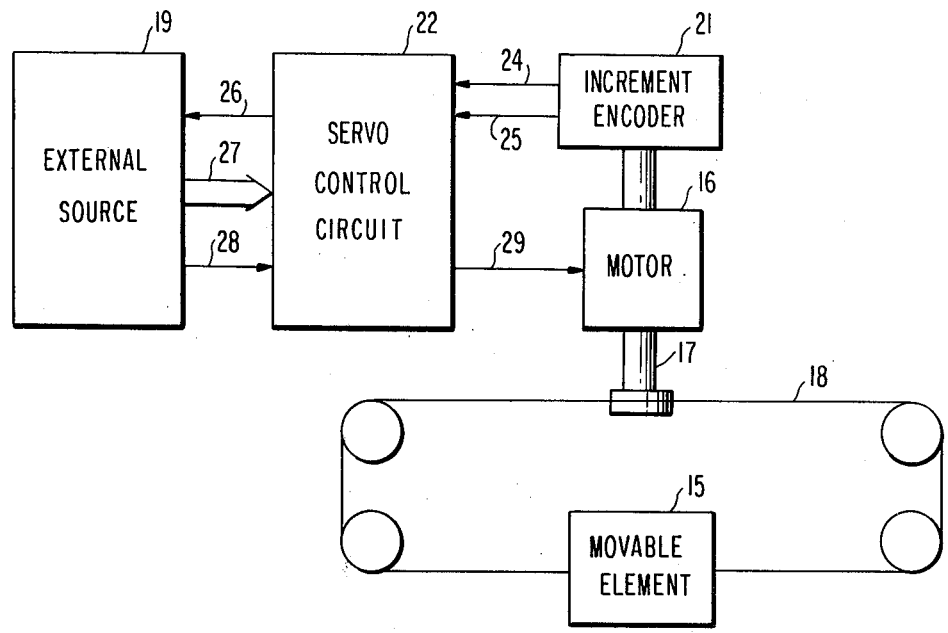
FIG. 1 illustrates in blocks a position control system to which the instant invention is applicable, together with a movable element, a motor, and a command signal generator.

It is to be noted at the outset that signals and lines for transmitting the respective signals are often designated by same reference characters.

Referring now to FIG. 1, a position control system to which the present invention is applicable is for use in combination with a movable element 15, such as a carriage of a serial printer of the impact type, a motor 16 for controllably rotating an axle 17 thereof with a variable angular velocity. Merely for convenience of illustration, the axle 17 is depicted to pass through the motor 16. The axle 17 is coupled to the element 15 by means of an endless belt 18 to controllably vary a current or instantaneous position of the element 15. The position control system is for use in combination also with a command signal generator or external source 19, such as an electronic digital computer, for producing a digital command signal indicative in general of successively commanded positions for the element 15. It is possible to assume without loss of generality that the axle 17 is kept in a predetermined direction. The "angular velocity" as called herein is therefore specified by its magnitude and sense. Furthermore, the expression is used herein such that the "motor" 16 is rotatable in one or the other sense at a time.

Further referring to FIG. 1, the position control system comprises an increment encoder or position transducer 21 and a servo control circuit 22. The increment encoder 21 is mechanically or otherwise coupled to the motor 16 to produce a pair of polarity variable incremental position signals 24 and 25 and supplies the same to the servo control circuit 22. As will later be described in detail, the incremental position signals 24 and 25 vary their respective polarities in response to every predetermined angle of rotation of the motor 16 and have a phase difference therebetween that is representative of the sense of a current or instantaneous angular velocity of the motor 16. A rate at which changes occur in the polarity of the incremental position signals 24 and 25 depends on the current angular velocity. The command signal for each commanded position or end portion is produced in response to a new data request signal 26 supplied from the servo control circuit 22 in the manner described later and comprises a distance signal 27 and a sense signal 28, which are supplied to the servo control circuit 22. The distance signal 27 is usually representative of a distance of the end point from a next previous commanded position or start point and consists of a predetermined number of bits, such as eleven bits. The sense signal 28 indicates a plus or a minus sense, such as counterclockwise and clockwise sense, of rotation of the motor 16 at a time and may be an additional bit of the distance signal 27, such as a twelfth bit. Responsive to the incremental position signals 24 and 25 and the command signal 27-28, the servo control circuit 22 supplies a motor drive signal 29 to the motor 16 to make the motor 16 move the movable element 15 eventually to the end point as will become clear as the description proceeds.

Figure 2:
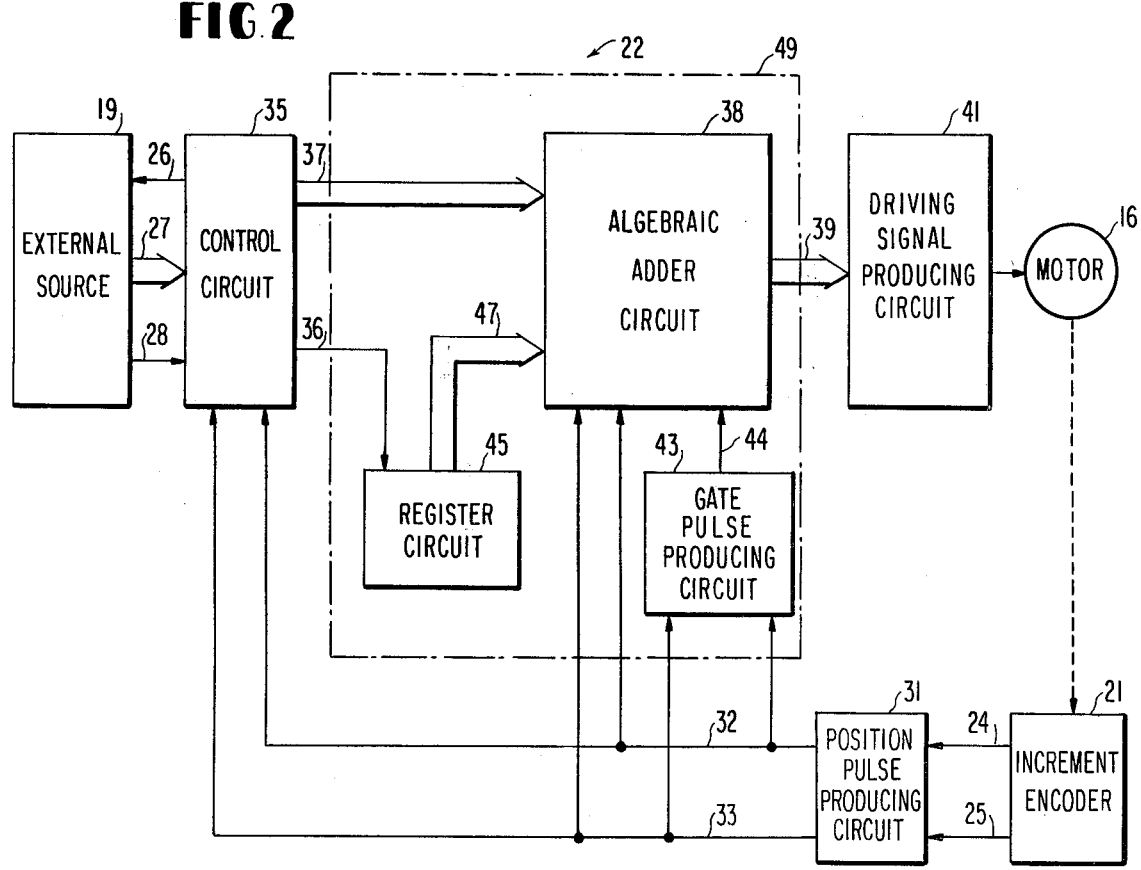
FIG. 2 shows in blocks a position control system according to a first embodiment of this invention, together with the motor and the command signal generator.

Referring to FIG. 2, a position control system according to a first embodiment of this invention is shown together with the motor 16 and the command signal generator 19. The position control system comprises the increment encoder 21 and the servo control circuit 22. As described hereinabove, the increment encoder 21 produces a pair of incremental position signals 24 and 25. The servo control circuit 22 supplies a new data request signal 26 to the command signal generator 19 and receives therefrom a distance signal 27 and a sense signal 28 as a command signal. Responsive to the position signals 24 and 25 and the command signal 27-28, the servo control circuit 22 supplies a motor drive signal 29 to the motor 16. The servo control circuit 22 comprises a position pulse or pulse sequence producing circuit 31 for sensing the changes in the polarity of the incremental position signals 24 and 25 and also the phase difference therebetween to produce position pulses representative in effect of a current angular position of the motor 16 and the current angular velocity. In the example being illustrated, the position pulses are produced as pulses of a first or a second position pulse sequence 32 or 33 depending on the phase difference. Position pulses of the first and the second pulse sequences 32 and 33 are produced when the current angular velocity has the plus and the minus sense, respectively, with an interval $T_i$ representative of the magnitude of the current angular velocity.

Further referring to FIG. 2 let it be presumed that the sense signal 28 indicates the plus sense of rotation of the motor 16. When produced, the distance and the sense signals 27 and 28 are stored in a control circuit 35 of the servo control circuit 22. At first, the control circuit 35 produces a mode signal 36 indicative of a velocity control mode as named herein and a digital control signal 37 representative of a position reference angular velocity predetermined for the motor 16. As will presently be understood, the control signal 37 passes through a digital algebraic adder circuit 38 to become a digital output signal 39. Responsive to the output signal 39, a driving signal producing circuit 41 produces the motor drive signal 29 to put the motor 16 into rotation in the pulse sense. The position pulse producing circuit 31 begins to produce the first or plus position pulse sequence 32. Responsive to the position pulses 32, a gate pulse producing circuit 43 produces a sequence of gate pulses 44 of a predetermined pulse width $T_p$ with the interval $T_i$ of the position pulses 32. Supplied with the mode signal 36, a memory or register circuit 45 of the servo control circuit 22 produces a reference signal 47 representative of a first digital reference feedback value $A_1$. Responsive to the plus position pulse sequence 32, control signal 37, gate pulses 44, and reference signal 47, the algebraic adder circuit 38 calculates a difference between the reference angular velocity and the reference feedback value $A_1$ during the presence of each of the gate pulses 44 by subtracting the latter from the former to make the output signal 39 represent the difference and the reference angular velocity during presence and absence, respectively, of the gate pulses 44. Responsive to the position pulses 32, the control circuit 35 calculates a position error between the current and the commanded positions of the movable element 15 (FIG. 1). preferably, the reference angular velocity is stepwise reduced as the position error decreases. For convenience of description, a combination of the algebraic adder circuit 38, gate pulse producing circuit 43, and memory circuit 45 are referred to as a feedback circuit 49.

The driving signal producing circuit 41 shown in FIG. 2 comprises a digital-to-analog converter (not depicted in FIG. 2) for converting the digital output signal 39 to an analog signal, which is a sequence of velocity feedback pulses as called herein. When the reference signal 47 represents the first digital reference feedback value $A_1$, the velocity feedback pulses have a pulse height proportional to the feedback value $A_1$, a common pulse width equal to the gate pulse width $T_p$, and a pulse interval equal to the position and gate pulse interval $T_i$ and consequently have an average voltage proportional to $A_1 \cdot T_p / T_i$. The position pulse interval $T_i$ is inversely proportional to the magnitude of the current angular velocity of the motor 16. The velocity feedback pulses therefore indicates, when smoothed, the motor speed. It is thus possible to give the motor 16 with velocity feedback of a level proportional to $A_1 \cdot T_p$ and to control the motor 16 to make the magnitude of the current angular velocity follow the reference angular velocity or velocities until the position error decreases to a predetermined value, when the control circuit 35 makes the mode and the control signals 36 and 37 indicate a position control mode as named herein and represent the position error, respectively. Responsive to the mode signal 37 indicative of the position control mode, the reference signal 47 is made to represent a second digital reference feedback value $A_2$. The digital output signal 39 now represents the position error and a difference between the position error and the second feedback value $A_2$ during absence and presence, respectively, of the gate pulses 44. In the position control mode, the velocity feedback is proportional to $A_2 \cdot T_p$. When smoothed, the velocity feedback pulses serve as a damping signal for the motor speed to make the motor 16 eventually place the movable element 15 at rest at the end point. The control circuit 35 produces the new data request signal 26 and receives the command signal 27-28 for a new end point. By selection of the feedback values $A_1$ and $A_2$, it is possible to separately provide optimum velocity feedback in the velocity and the position control modes.

Still further referring to FIG. 2, let it now be surmised that the sense signal 28 indicates the minus sense of rotation of the motor 16. The digital control signal 37 represents a minus reference angular velocity for the motor 16. The position pulses are of the second or minus position pulse sequence 33. In the velocity control mode, the digital algebraic adder circuit 38 calculates a sum of the minus reference angular velocity and the first digital reference feedback value $A_1$ during presence of the gate pulses 44 to make the digital output signal 39 represent the sum and the minus reference angular velocity during presence and absence, respectively, of the gate pulses 44. In the position control mode, the digital output signal 39 represents the position error and a sum of the position error and the second digital reference feedback value $A_2$ during absence and presence, respectively, of the gate pulses 44.

Figure 3:
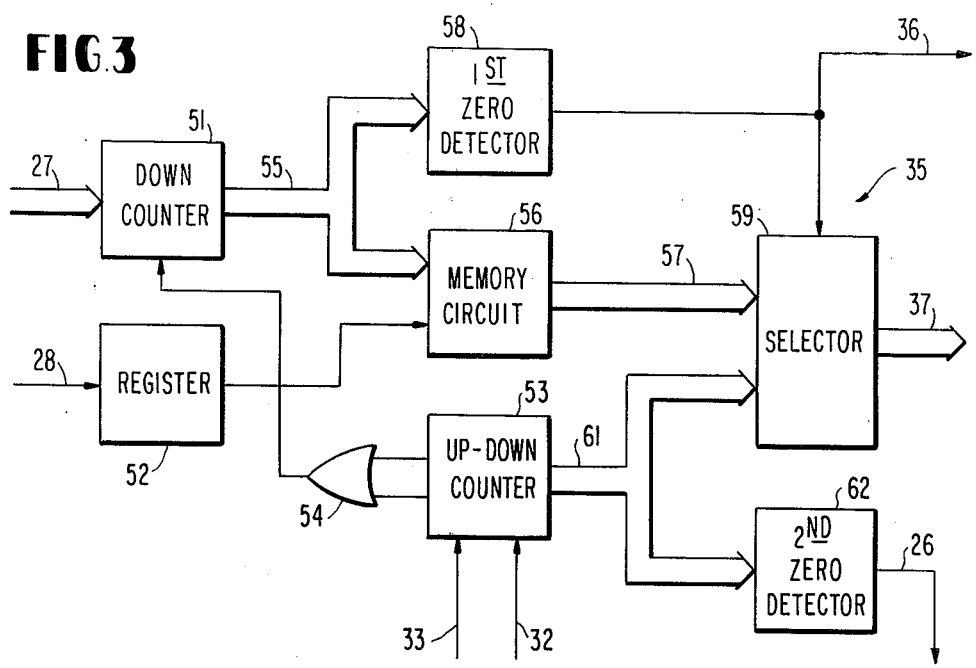
FIG. 3 is a block diagram of a control circuit used in the position control system illustrated in FIG. 2.

Turning to FIG. 3, a control circuit 35 for use in a servo control circuit 22 used in a position control system according to this invention comprises a down counter 51 in which the distance signal 27 is set as an initial count. The control circuit 35 further comprises a register 52 for holding the sense signal 28 and an up-down counter 53 for counting down the plus position pulses 32 and counting up the minus position pulses 33 to supply carry down and up signals to the down counter 51 through an OR gate 54. Responsive to the carry down or up signals, the down counter 51 counts down the initial count to produce a first position error signal 55. Supplied with the sense signal 28 held in the register 52 and the first position error signal 55 as an address signal, a memory circuit 56 delivers the reference signal to a line 57. Responsive to the first position error signal 55, a first zero detector 58 makes the mode signal 36 indicate the velocity and the position control mode when the first position error signal 55 does not represent and represents zero, respectively. Supplied with the mode signal 36 indicative of the velocity control mode, a selector 59 supplies the reference signal to the line 37. For the distance signal 27 of eleven bits, the up-down counter 53 is preferably a three-bit counter that produces a second position error signal 61 representative of the position error in the position control mode. Responsive to the mode signal 36 indicative of the position control mode, the selector 59 supplies the second position error signal 61 to the line 37. A second zero detector 62 produces the new data request signal 26 when the second position error signal 61 becomes zero during the position control mode. It is possible to make the first zero detector 58 produce the new data request signal 26 a prescribed interval of time after the mode signal 36 is switched to indicate the position control mode. Alternatively, the command signal genarator 19 may be programmed to switch a predetermined duration of time after production of the command signal 27-28 for an end point to the command signal 27-28 for a new end point.

Figure 4:
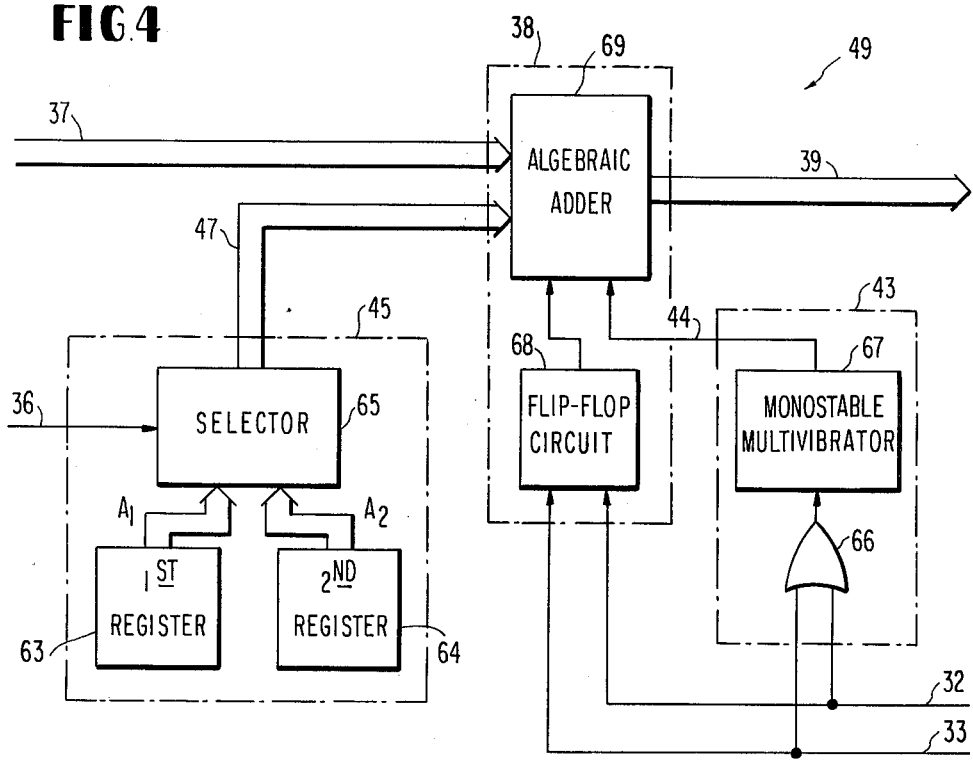
FIG. 4 is a block diagram of a feedback circuit used in the position control system depicted in FIG. 2.

Referring to FIG. 4, the memory circuit 45 of the feedback circuit 49 used in the position control system illustrated with reference to FIG. 2 comprises first and second registers 63 and 64 preset with signals for the first and the second digital reference feedback values $A_1$ and $A_2$, respectively, and a selector 65 responsive to the mode signal 36 indicative of the velocity and the position control modes for selectively making the reference signal 47 represent the first and the second feedback values $A_1$ and $A_2$, respectively. The gate pulse producing circuit 43 comprises an OR gate 66 for supplying either of the plus and the minus position pulses 32 and 33 to a monostable or one-shot multivibrator 67 to make the latter produce the gate pulses 44. The digital algebraic adder circuit 38 comprises a flip-flop circuit 68 set and reset by the plus and the minus position pulses 32 and 33, respectively, and a digital algebraic adder 69 supplied with the gate pulses 44 for calculating the algebraic sum, namely, the above-mentioned difference and sum while the flip-flop circuit 68 is set and reset, respectively. The flip-flop circuit 68 may be set and reset by the minus and the plus position pulses 32 and 33, respectively.

Figure 5:
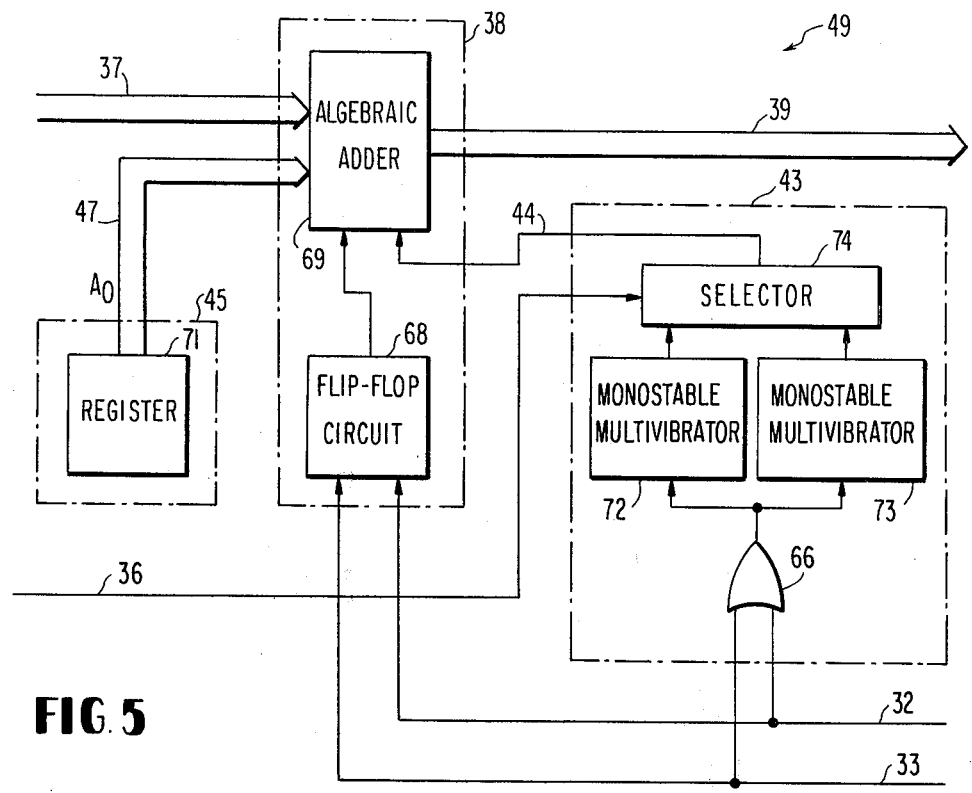
FIG. 5 is a block diagram of a feedback circuit for use in a position control system according to a second embodiment of this invention.

Referring temporarily to FIG. 5, a feedback circuit 49 for use in a position control system according to a second embodiment of this invention comprises similar parts designated by like reference numerals as in FIG. 4. The memory circuit 45 comprises a single register 71 preset with a signal representative of a single reference feedback value $A_0$ for both the velocity and the position control modes. Instead, the gate pulse producing circuit 43 comprises first and second monostable multivibrators 72 and 73 responsive to either of the plus and the minus position pulse sequences 32 and 33 for producing first and second gate pulses having first and second predetermined pulse widths $T_{p1}$ and $T_{p2}$, respectively, and a selector 74 responsive to the mode signal 36 indicative of the velocity and the position control modes for selecting the first and the second gate pulses, respectively. With the position control system according to the second embodiment of this invention, the optimum velocity feedback is proportional to levels $A_0 \cdot T_{p1}$ and $A_0 \cdot T_{p2}$ in the velocity and the position control modes, respectively.

Figure 6:
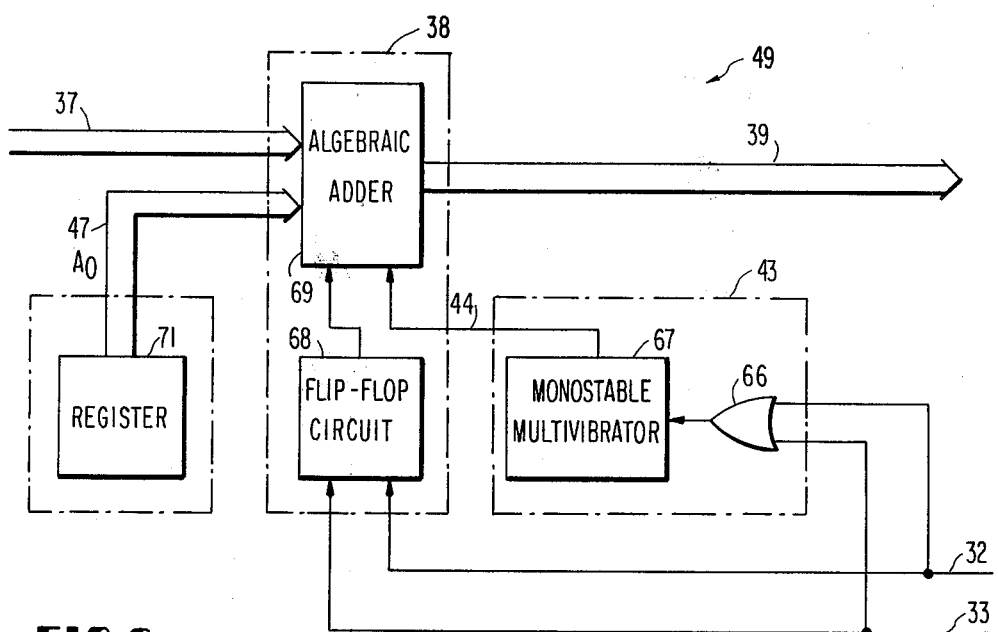
FIG. 6 is a block diagram of a feedback circuit for use in a position control system according to a third embodiment of this invention.

Referring to FIG. 6, a feedback circuit 49 for use in a position control system according to a third embodiment of this invention comprises similar parts designated by like reference numerals as in FIGS. 4 and 5. It is to be noted that the mode signal 36 is used only in the control circuit 35 (FIG. 2) to make the digital control signal 37 represent the reference angular velocity or velocities and the position error in the velocity and the position control modes, respectively. If used, the second zero detector 62 is also controlled by the mode signal 36 to produce the new data request signal 26. The velocity feedback is proportional to a level $A_0 \cdot T_p$ both in the velocity and the position control modes. As is obvious from FIG. 6, the position control system is simplified in structure according to the third embodiment.

As a modification of the gate pulse producing circuit 43 for use in the position control system according to the second embodiment of this invention, use is possible of a single monostable multivibrator of which time constant is switched in response to the mode signal 36 to produce the first and the second gate pulses. The feedback circuit 49 may be dispensed with the memory circuit 45 for the reference signal 47, with the command signal generator 19 programmed to supply the reference signal 47 to the digital algebraic adder circuit 38 or the digital algebraic adder 69.

Figure 7:
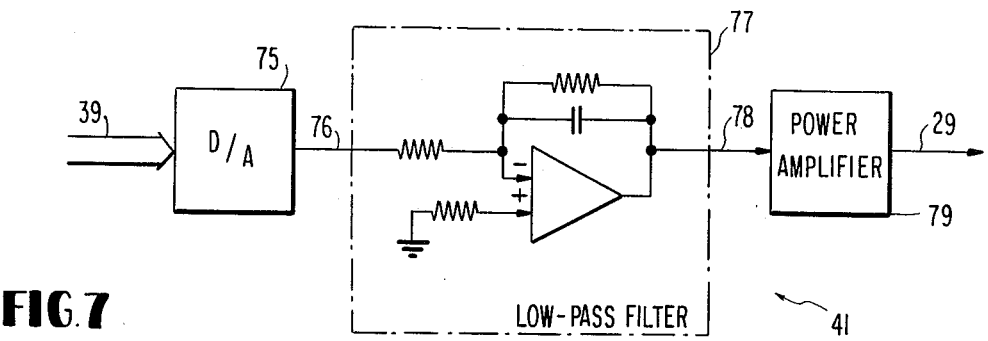
FIG. 7 is a block diagram of a driving signal producing circuit used in the position control system shown in FIG. 2.

Referring now to FIG. 7, the driving signal producing circuit 41 comprises a digital-to-analog converter 75 mentioned above for converting the digital output signal 39 to an analog signal 76 consisting of the above-mentioned position error signal or of the reference angular velocity signal and velocity feedback pulses, a low-pass filter 77 for smoothing the analog signal 76 to produce a smoothed analog signal 78, and a power amplifier 79 for amplifying the smoothed analog signal 78 into the motor drive signal 29. As shown, the low-pass filter 77 may comprise an operational amplifier. The cutoff frequency of the low-pass filter 77 should be such as to smooth the velocity feedback pulses and to allow passage of the control signal 37 representative of the reference angular velocity signal or the position error signal.

Figure 8:
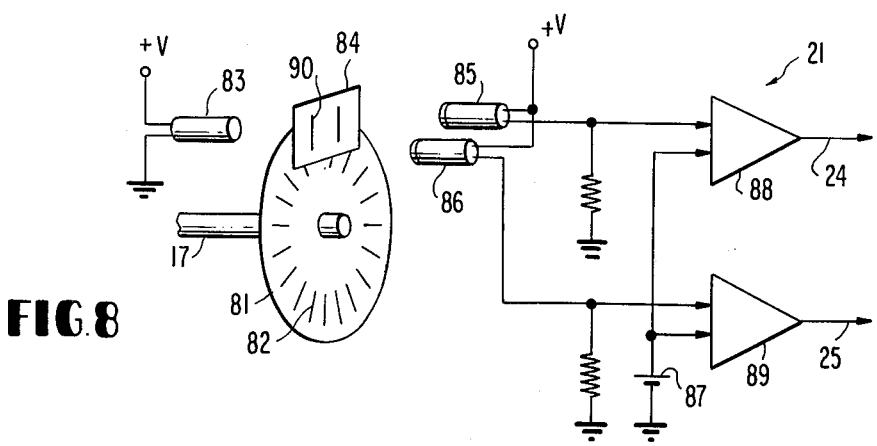
FIG. 8 shows partly as a schematic perspective view and partly in blocks an increment encoder used in the position control system illustrated in FIG. 2.
Figure 9:
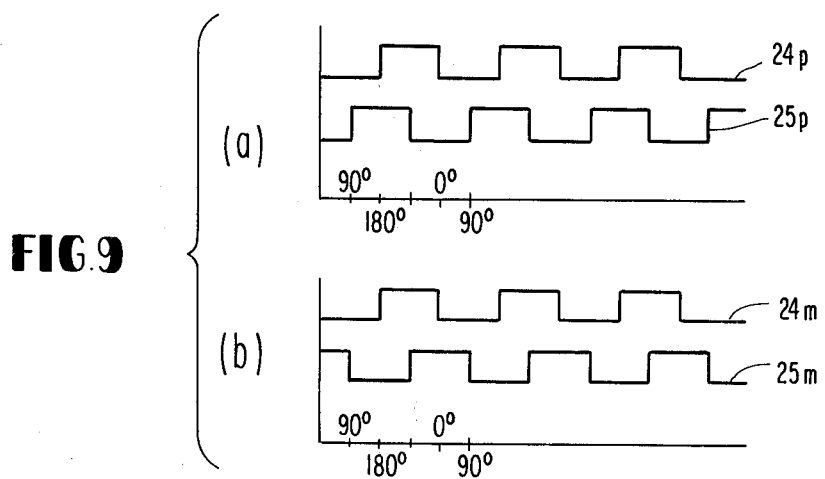
FIGS. 9 (a) and (b) schematically show incremental position signals produced by the increment encoder illustrated in FIG. 8.

Referring to FIGS. 8 and 9, the increment encoder 21 may comprise a rotatable opaque disk 81 mounted on the motor shaft 17 and having azimuthally equally spaced radial slits or position information patterns 82, a light source 83 for illuminating the radial slits 82, and a fixed opaque plate 84 provided with a pair of slits 90 arranged for alignment with the radial slits 82. The encoder 21 further comprises a pair of optical sensors 85 and 86 aligned with the slit pair and energized by an electric power symbolized at $+V$ to produce electric signals when illuminated, a source 87 of a reference voltage, and comparators 88 and 89 for comparing the respective electric signals with the reference voltage. The azimuthally equal spacing of the radial slits 82 is decided in consideration of the predetermined incremental angle of rotation of the motor 16. The number of the radial slits 82 may be, for example, six hundred. By making the spacing between the slit pair 90 differ from the azimuthally equal spacing by a quarter, it is possible to make the comparator 88 and 89 produce the incremental position signals 24 and 25 exemplified In FIGS. 9 (a) and (b) and described more in detail in the following.

Referring to FIGS. 9 (a) and (b), the incremental position signals 24 and 25 have phases designated by A and B as depicted at 24p, 25p, 24m, and 25m and are now called A-phase and B-phase incremental position signals 24 and 25, respectively. The A-phase and the B-phase signals 24p and 25p depicted in FIG. 9 (a) are produced when the angular velocity of the motor 16 has the plus sense. The A-phase and the B-phase signals 24m and 25m shown in FIG. 9 (b) are produced for the minus sense of rotation of the motor 16. With the azimuthally equal spacing of the radial slits 82 (FIG. 8) defined to be 360° in space degree, the phase difference between the A and the B phases is equal to 90° when the motor 16 is in rotation.

Figure 10:
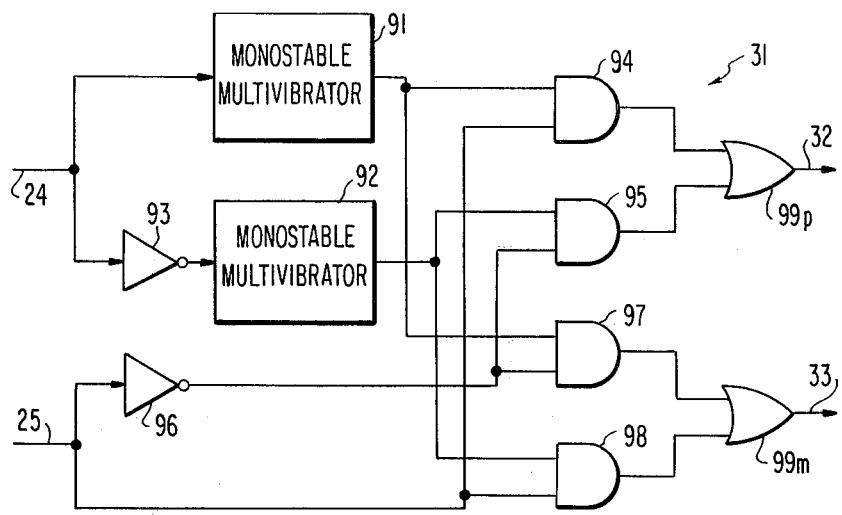
FIG. 10 is a block diagram of a position pulse producing circuit used in the position control system depicted in FIG. 2.

Referring now to FIG. 10, the position pulse producing circuit 31 for the incremental position signals 24 and 25 of the type illustrated with reference to FIGS. 9 (a) and (b) may comprise first and second monostable multivibrators 91 and 92 supplied with the A-phase incremental position signal 24 both directly and through a first inverter 93, respectively. Responsive to build up of the respective pulses of the A-phase signal 24, the first monostable multivibrator 91 produces first pulses of a short duration, such as one hundred nanoseconds. Responsive to build down of the respective A-phase pulses 24, the second monostable multivibrator 92 produces second pulses of the short duration. When the angular velocity of the motor 16 has the plus sense, a first AND gate 94 enabled by the pulses of the B-phase signal 25 allows passage therethrough of the first pulses. A second AND gare 95 is enabled by the B-phase pulses 25 supplied thereto through a second inverter 96 and allows the second pulses to pass therethrough. When the motor 16 rotates in the minus sense, a third AND gate 97 is enabled by the inverted B-phase pulses for the second pulses. A fourth AND gate 98 is enabled by the B-phase pulses 25 also for the second pulses. Supplied with the first and the second pulses from the first and the second AND gates 94 and 95 and from the third and the fourth AND gates 97 and 98, first and second OR gates 99p and 99m produces the plus and the minus position pulse sequences 32 and 33, respectively.

Figure 11:
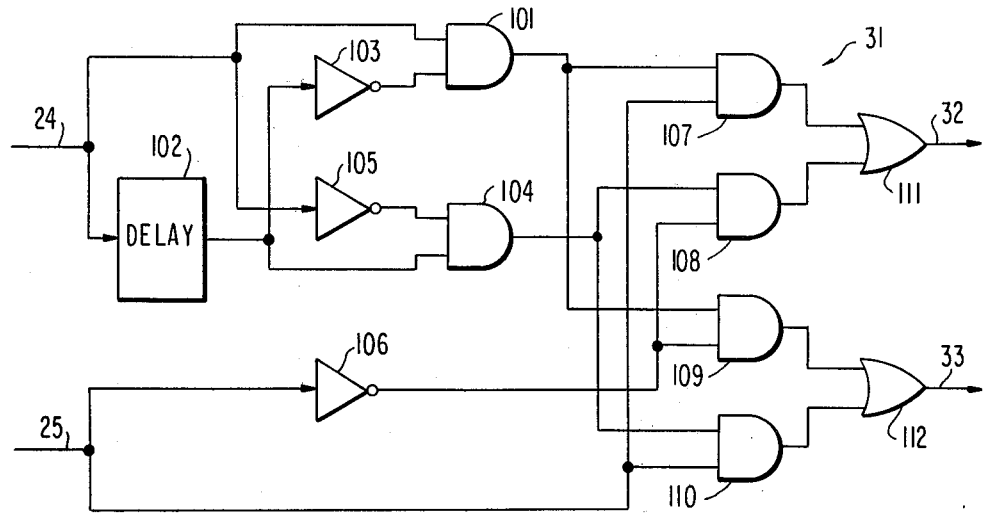
FIG. 11 is a block diagram of another position pulse producing circuit for use in the position control system shown in FIG. 2.

Referring to FIG. 11, the position pulse producing circuit 31 for the incremental position signals 24 and 25 of the type described in conjunction with FIGS. 9 (a) and (b) may alternatively comprise a first AND gate 101 having two inputs supplied with the A-phase pulses 24 directly and through a delay circuit 102 for a short delay, such as one hundred nanoseconds, followed by a first inverter 103, respectively. A second AND gate 104 also has two inputs, which are supplied with the delayed A-phase pulses and the A-phase pulses 24 through a second inverter 105, respectively. The first and the second AND gates 101 and 104 produce first and second short pulses of the type described with reference to FIG. 10. The illustrated position pulse producing circuit 31 further comprises a third inverter 106, third through sixth AND gates 107, 108, 109, and 110, and first and second OR gates 111 and 112 that correspond to the circuit elements 96, 94, 95, 97, 98, 99p, and 99m (FIG. 10), respectively.

Figure 12:
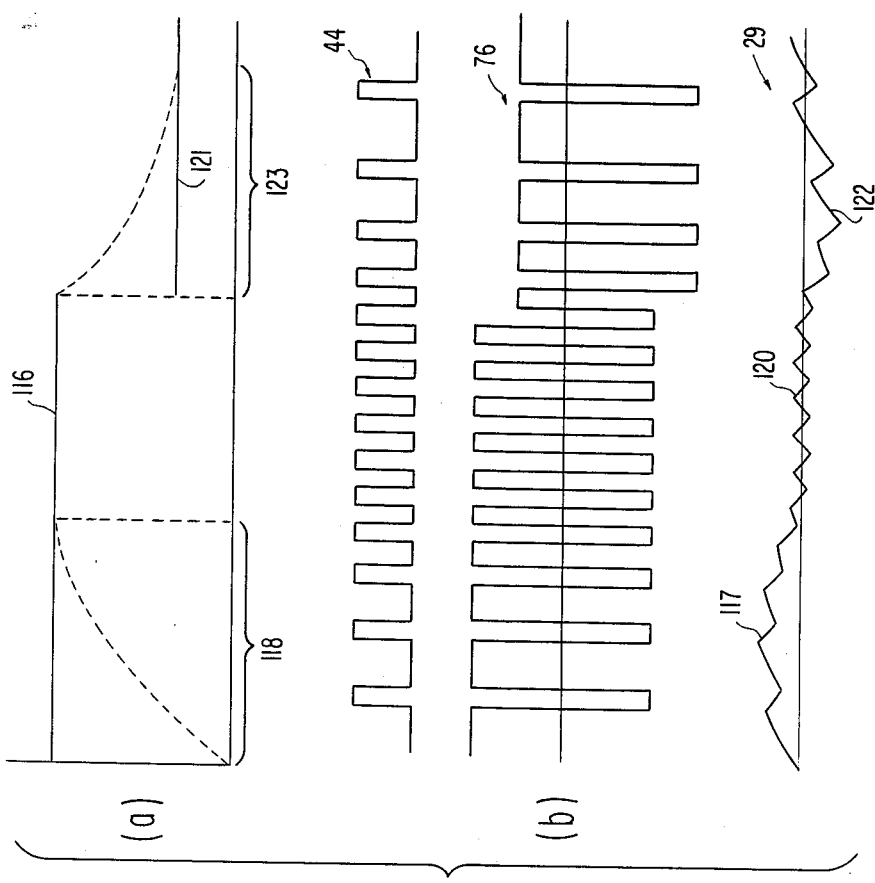
FIG. 12 (a) shows reference velocities given by control signals produced by the control circuit shown in FIG. 3.

Turning to FIGS. 12 (a) and (b), the control circuit 35 (FIG. 2) produces the new data request signal 26 and receives the distance and the sense signals 27 and 28 as the command signal to produce the control signal 37 when the movable element 15 (FIG. 1) is brought at rest to a start point. It is assumed that the sense signal 27 indicates the plus sense of rotation of the motor 16. The control signal 37 indicates a first positive reference angular velocity 116 for the motor 16. As described, the control signal 37 passes through the digital adder circuit 38 at first to put the motor 16 into rotation in the plus sense. The digital adder circuit 38 subtracts the first digital reference feedback value $A_1$ from the first reference angular velocity 116 only during presence of the gate pulses 44 of the common width $T_p$. The analog signal 76 vary between top and bottom levels that correspond to the first positive reference angular velocity 116 and the angular velocity 116 less than the first reference feedback value $A_1$, respectively. The motor drive signal 29 has a positive level 117 during an accelerating period 118 of the motor speed. The motor speed increases as exemplified by a broken line to the first reference angular velocity 116 until the motor drive signal 29 is given a zero level 120 in average to keep the current angular velocity at the first positive reference angular velocity 116. When the position error of the movable element 15 decreases to a certain prescribed value, the memory circuit 56 switches the control signal 37 to make the same indicate a second positive reference angular velocity 121 in preparation for operation in the position control mode. The analog signal 76 vary between two levels corresponding to the second positive reference angular velocity 121 and that velocity 121 less the first reference feedback value $A_1$, respectively. The motor drive signal 29 is given a negative level 122 to drive the motor 16 in a decelerating period 123 of the motor speed.

Figure 13:
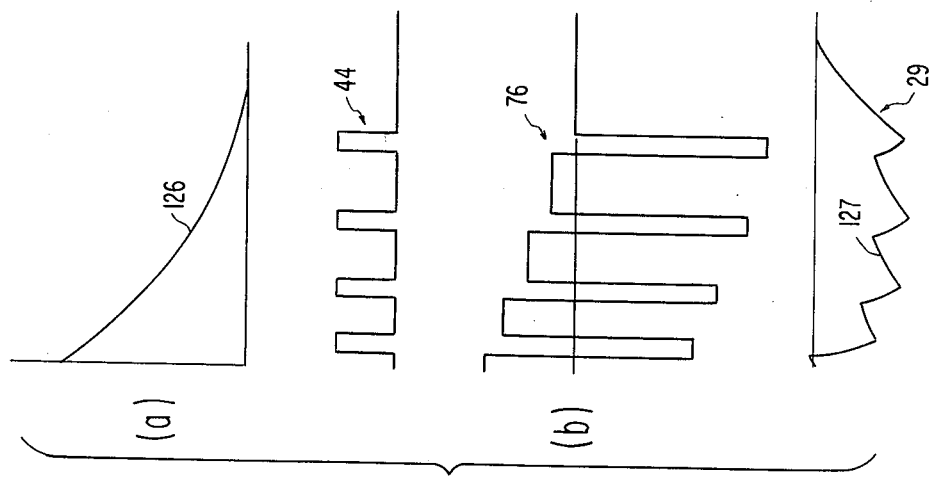
FIG. 13 (a) shows a decreasing position error given by a control signal produced by the control circuit shown in FIG. 2.

Referring to FIGS. 13 (a) and (b), the control circuit 35 (FIG. 2) makes the control signal 37 represent a decreasing position error 126 when the position error of the movable element 15 (FIG. 1) is reduced to the predetermined distance as the motor 16 is driven in the manner described with reference to FIGS. 12 (a) and (b). The analog signal 76 now vary between two levels that correspond to the decreasing position error 126 and that position error 126 minus the second reference feedback value $A_2$, respectively. Inasmuch as the pulse interval common to the position and the gate pulses 32 and 44 increases, the motor drive signal 29 is given a level 127 that is substantially equal to zero at the beginning of operation in the position control mode, takes a varying negative value to decelerate the motor speed, and eventually becomes zero as the position error of the movable element 15 converges to zero.

As regards the operation illustrated with reference to FIGS. 12 and 13, it is now readily understood that the motor speed is controlled to successively follow the reference angular velocities, such as 116 and 121, in the velocity control mode and to decrease to zero in accordance with the position error of the movable element 15 in the position control mode. According to the embodiment described in conjunction with FIG. 5, the common gate pulse width is $T_{p1}$ and $T_{p2}$ in the velocity and the position control modes, respectively, with the reference feedback value kept at $A_0$ throughout both modes. With the embodiment partly shown in FIG. 6, both the gate pulse width and the reference feedback value are maintained at $T_p$ and $A_0$, respectively, throughout the velocity and the position control modes.

Finally referring to FIG. 14, a position control system according to a fourth embodiment of this invention is illustrated together with the motor 16 and the command signal generator 19 of the type described with reference to FIG. 1. The position control system comprises the increment encoder 21 of the type described and a servo control circuit 22 to be presently described. The increment encoder 21 supplies the above-mentioned incremental position signal pair 24 and 25 to the servo control circuit 22. Responsive to the new data request signal 26, the command signal generator 19 supplies the servo control circuit 22 with the distance and the sense signals 27 and 28 as the command signal. The servo control circuit 22 supplies the motor drive signal 29 to the motor 16. Merely for convenience of description, the driving signal producing circuit 41 is depicted outside that block 22' of the servo control circuit 22 which deals with the digital signals.

Figure 14:
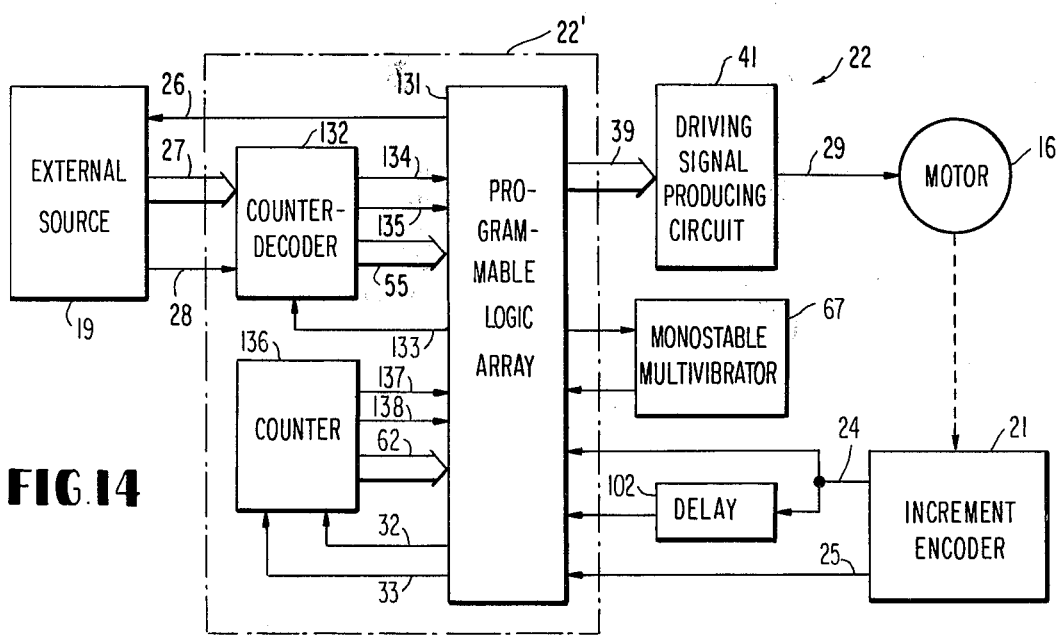
FIG. 14, shown in blocks together with a motor and a command signal generator and depicted below FIG. 1 for convenience of illustration, is a block diagram of a position control system according to a fourth embodiment of this invention.

Further referring to FIG. 14, the block 22' comprises a programmable logic array 131 that may be an integrated circuit comprising two stages of AND and OR gates, such as that provided by the use of two bipolar field-programmable logic arrays 82S 100 (sixteen inputs and eight outputs with forty-eight product terms) described in "Data Manual" published 1976 by Signetics Corporation, page 60 ('Memories'). By the use of a monostable multivibrator 67 and a delay circuit 102 as in FIGS. 4 and 6 and in FIG. 11, it is possible to make the programmable logic array 131 function as the position and the gate pulse producing circuits 31 and 43 shown in FIG. 2. The block 22' further comprises a counter-decoder 132 comprising a cascade connection of a counter and a decoder (not separately shown) to serve as the down counter 51 and the register 52 (FIG. 3). In the example being illustrated, the distance signal 27 is an eleven-bit signal. Responsive to a down count signal 133, the counter-decoder 132 produces the first position error signal 55 of three bits and, as the sense signal reproduced by the register 52, either of one-bit forward and reverse signals 134 and 135. The block 22' still further comprises a counter 136 that receives the plus or the minus position pulses 32 or 33 from the programmable logic array 131 and serves as the up-down counter 53 (FIG. 3) for supplying the programmable logic array 131 with the second position error signal 62 of three bits in the illustrated example and either of carry up and down signals 137 and 138. The programmable logic array 131 thus serves as that part of the embodiment described with reference to FIG. 2 and the example illustrated in FIG. 3 which comprises the digital adder circuit 38, OR gate 54, memory circuit 56, first zero detector 58, selector 59, and second zero detector 62. The programmable logic array 131 supplies the digital output signal to the driving signal producing circuit 41.

While a few preferred embodiments of this invention and modifications thereof have thus far been described, it is now readily possible for those skilled in the art to put this invention into practice in various other ways. For example, it is possible to use a mode signal, such as 36, indicative only of the position control mode with the selector 59 made to select a single reference angular velocity in the absence of this mode signal. Use of such a mode signal does not preclude use of another mode signal for selecting one of a predetermined number of digital reference angular velocities at a time and is equivalent to use of a mode signal indicative of the velocity control mode alone. It is possible to use a position control system according to this invention for two motors, such as 16, for a carriage and a print wheel of a serial printer of the impact type with the new data request signal 26 used also as a switching signal for making the system alternatingly serve for the respective motors. This system is equally well applicable to positioning of any other movable element particularly when intermittent movement of the element is mandatory. For this purpose, the down counter 51 or the counter-decoder 132 alone may be used to produce a single position error signal with the first zero detector 58 or the correponding element of the programmable logic array 131 used to switch the mode signal 36 between indication of the velocity and the position control modes and further to indication of the new data request and others and with such a single position error signal supplied to the memory circuit 56 or the equivalent in the progammable logic array 131 as the address signal. For the system illustrated with reference to FIG. 14, it is readily possible to make a programmable logic array comprise the counter-decoder 132 and/or the counter 136. It should clearly be understood that the control circuit 35, feedback circuit 49, driving signal producing circuit 41, increment encoder 21, and position signal producing circuit 31 are described with reference to FIGS. 3 through 11 only by way of example. For example, the algebraic adder 69 is equivalent to an arithmetic adder or a subtractor. Although the system has not been invented primirily for a numerical control system for a machine tool or similar apparatus, it is possible with at least one system according to this invention to carry out three dimensional control of a set of motors for a movable element by making the command signal comprise a direction signal, such as that for the "curvature data" described in U.S. Pat. No. 4,061,907 issued to Kiyokazu Okamato et al, assignors to the present assignee, by which a set of reference angular velocities for the motor set is selected at least for a certain duration of time.

What is claimed is:

1. In a position control system for use in combination with a movable element, a motor rotatable with a variable angular velocity to controllably vary a current position of said element, and a command signal generator for producing a command signal indicative of a commanded position of said element, said angular velocity having either of two senses of rotation at a time, said system comprising an increment encoder to be coupled to said motor to produce a pair of polarity variable incremental position signals and servo control means responsive to said command and said position signals for supplying a motor drive signal to said motor to make said motor move said element eventually to said commanded position, said position signals varying their respective polarities with a phase difference therebetween in response to every predetermined incremental angle of rotation of said motor, each of said position signals thereby varying its polarity at a rate dependent on a current angular velocity of said motor, said phase difference being representative of the sense of said current angular velocity, the improvement wherein said servo control means comprises:

position pulse producing means responsive to said incremental position signals for producing position pulses representative of an angular position of said motor and said current angular velocity;

mode signal producing means responsive to said command signal and said position pulses for producing a mode signal during an interval of time during which said current position is within a predetermined distance from said commanded position;

control signal producing means responsive to said command signal, said position pulses, and said mode signal for producing a control signal representative of a digital control datum, said control datum giving a position error between said current and said commanded positions during presence of said mode signal and otherwise giving at least one reference angular velocity;

gate pulse producing means responsive to said position pulses for producing gate pulses of a predetermined pulse width at a time at a rate dependent on said current angular velocity;

digital adder means responsive to a reference signal respresentative of a digital reference feedback value at a time, said gate pulses, said position pulses, and said control signal for calculating during presence of each of said gate pulses an algebraic sum of said reference feedback value and said control datum to produce a digital signal, said algebraic sum being one of an arithmetic sum and a difference that is determined by that sense of said current angular velocity with which said each gate pulse is related, said digital signal being representative of the algebraic sums and the control data during presense and absense, respectively, of said gate pulses; and a driving signal producing circuit responsive to said digital signal for producing said motor drive signal.

2. A position control system as claimed in claim 1, wherein said control signal producing means comprises;

means responsive to said command signal and said position pulses for producing an error signal; and means responsive to said error and said mode signals for producing said control signal, said digital control datum giving said position error and alternatively giving one of the reference angular velocities that is selected in compliance with said error signal.

3. A position control system as claimed in claim 1, wherein said digital adder means comprises:

memory means for memorizing said digital reference feedback value to produce said reference signal; and algebraic adder means reponsive to the reference signal produced by said memory means, said gate pulses, said position pulses, and said control signal for calculating said algebraic sum to produce the digital signal during presence of said gate pulses.

4. A position control system as claimed in claim 1, wherein said position pulse producing means comprises:

pulse sequence producing means responsive to said incremental position signals for producing one of a first and a second pulse sequence at a time depending on said phase difference, the pulses of said first and said second pulse sequences being representative of the angular position that said motor takes while said current angular velocity is kept in one and the other of said two senses, respectively; and means for supplying said algebraic adder means with the pulses of one of said first and said second pulse sequences as said position pulses that is produced by said pulse sequence producing means.

5. A position control system as claimed in claim 1, wherein said driving signal producing circuit comprises:

an analog-to-digital converter for converting said digital signal to an analog signal;

a low-pass filter for smoothing said analog signal into a smoothed analog signal; and a power amplifier for amplifying said smoothed analog signal into said motor drive signal.

6. A position control system as claimed in claim 1, wherein said digital adder means comprises:

memory means for memorizing a first and a second digital value and responsive to said mode signal for producing said reference signal representative as said reference feedback value of said first and said second digital values during absense and presence of said mode signal, respectively; and algebraic adder means responsive to the reference signal produced by said memory means, said gate pulses, said position pulses, and said control signal for calculating said algebraic sum to produce the digital signal during presence of said gate pulses.

7. A position control system as claimed in claim 6, wherein said position pulse producing means comprises:

pulse sequence producing means responsive to said incremental position signals for producing one of a first and a second pulse sequence at a time depending on said phase difference, the pulses of said first and said second pulse sequences being representative of the angular position that said motor takes while said current angular velocity is kept in one and the other of said two senses, respectively; and means for supplying said algebraic adder means with the pulses of one of said first and said second pulse sequences as said position pulses that is produced by said pulse sequence producing means.

8. A position control system as claimed in claim 6, wherein said driving signal producing circuit comprises:

an analog-to-digital converter for converting said digital signal to an analog signal;

a low-pass filter for smoothing said analog signal into a smoothed analog signal; and a power amplifier for amplifying said smoothed analog signal into said motor drive signal.

9. A position control system as claimed in claim 1, wherein said gate pulse producing means comprises:

first-second pulse sequence producing means responsive to said position pulses and said mode signal for producing a first and a second pulse sequence during absence and presence of said mode signal, respectively, the pulses of said first and said second pulse sequences being produced at the rate dependent on said current angular velocity and having a first and a second width, respectively; and means for supplying said digital adder means with the pulses of one of said first and said second pulse sequences as said gate pulses that is produced by said first-second pulse sequence producing means, either of said first and said second widths of the pulses supplied from said first-second pulse sequence producing means to said digital adder means serving as said predetermined pulse width.

10. A position control system as claimed in claim 9, wherein said position pulse producing means comprises:

third-fourth pulse sequence producing means responsive to said incremental position signals for producing a third and a fourth pulse sequence at a time depending on said phase difference, the pulses of said third and said fourth pulse sequences being representative of the angular position that said motor takes while said current angular velocity is kept in one and the other of said two sences, respectively; and means for supplying said digital adder means with the pulses of one of said third and said fourth pulse sequences as said position pulses that is produced by said third-fourth pulse sequence producing means.

11. A position control system as claimed in claim 9, wherein said driving signal producing circuit comprises:

an analog-to-digital converter for converting said digital signal to an analog signal;

a low-pass filter for smoothing said analog signal into a smoothed analog signal; and a power amplifier for amplifying said smoothed analog signal into said motor drive signal.

12. A position control system as claimed in claim 1, said command signal generator further producing an additional signal representative of said digital reference feedback value, wherein said servo control means further comprises means connected to said digital adder means and to be connected to said command signal generator for supplying said additional signal to said digital adder means as said reference signal.

* * * * *

UNITED STATES PATENT AND TRADEMARK OFFICE
CERTIFICATE OF CORRECTION

PATENT NO. : 4,216,415

DATED : August 5, 1980

INVENTOR(S) : Shigeru SHIMONOU et al.

It is certified that error appears in the above—identified patent and that said Letters Patent is hereby corrected as shown below:

Column 4, lines 54-55, delete "portion" and insert -- point --

Column 5, line 38, after "indicative" delete the period.

line 68, delete "preferably" and insert -- Preferably --

Signed and Sealed this

Third Day of February 1981

[SEAL]

Attest:

RENE D. TEGTMEYER

Attesting Officer

Acting Commissioner of Patents and Trademarks